United States Patent
Tzadok et al.

(10) Patent No.: US 11,474,228 B2
(45) Date of Patent: Oct. 18, 2022

(54) RADAR-BASED DETECTION OF OBJECTS WHILE IN MOTION

(71) Applicant: International Business Machines Corporation, Armonk, NY (US)

(72) Inventors: Asaf Tzadok, New Castle, NY (US); Alberto Valdes Garcia, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 16/559,603

(22) Filed: Sep. 3, 2019

(65) Prior Publication Data
US 2021/0063559 A1 Mar. 4, 2021

(51) Int. Cl.
| | |
|---|---|
| *G01S 13/42* | (2006.01) |
| *G01S 13/04* | (2006.01) |
| *G01S 13/88* | (2006.01) |
| *G01S 13/90* | (2006.01) |
| *G01S 7/41* | (2006.01) |

(52) U.S. Cl.
CPC .......... *G01S 13/426* (2013.01); *G01S 7/417* (2013.01); *G01S 13/04* (2013.01); *G01S 13/886* (2013.01); *G01S 13/9029* (2013.01)

(58) Field of Classification Search
CPC ........ G01S 13/003; G01S 13/04; G01S 13/42; G01S 13/426; G01S 13/886; G01S 13/887; G01S 13/9029; G01S 7/417
See application file for complete search history.

(56) References Cited

U.S. PATENT DOCUMENTS

| | | | |
|---|---|---|---|
| 6,501,414 B2 | 12/2002 | Arndt et al. | |
| 6,876,322 B2 | 4/2005 | Keller | |

(Continued)

FOREIGN PATENT DOCUMENTS

| | | |
|---|---|---|
| CN | 103728606 A | 1/2014 |
| WO | WO2008048979 A2 | 4/2008 |
| WO | WO2018119153 A2 | 6/2018 |

OTHER PUBLICATIONS

Adani Systems web page, product BV 160165, downloaded on Mar. 9, 2019 from website https://www.adanisystems.com/products/parcel-baggage-and-small-cargo-x-ray-inspection/bv-160165/ 1 Page.

(Continued)

*Primary Examiner* — Timothy X Pham
(74) *Attorney, Agent, or Firm* — Daniel Morris; Otterstedt & Kammer PLLC (57) ABSTRACT

A radar-based security screening system for detecting objects is described. The screening system includes a radar transmitter, a radar receiver, and a processing unit. In use, the radar transmitter steers a radar beam across a screening volume. The radar receiver, in turn, receives a return signal from an object over time as the object moves in the screening volume to create a three-dimensional temporal signature for the object. The processing unit classifies the three-dimensional temporal signature utilizing a classification process based on a deep neural network model, and provides an alert when the object is classified as an object of interest. During screening, a screened person is not required to remain still in a confined volume and is not exposed to harmful radiation.

18 Claims, 7 Drawing Sheets

(56) References Cited

U.S. PATENT DOCUMENTS

| | | | |
|---|---|---|---|
| 7,365,672 | B2 | 4/2008 | Keller et al. |
| 7,417,440 | B2 | 8/2008 | Peschmann et al. |
| 8,027,029 | B2 | 9/2011 | Lu et al. |
| 8,842,050 | B2 | 9/2014 | Livneh et al. |
| 10,148,016 | B2 | 12/2018 | Johnson et al. |
| 10,163,137 | B2 | 12/2018 | Hoffberg |
| 2007/0075246 | A1 | 4/2007 | Gatt |
| 2008/0195347 | A1 | 8/2008 | Gatt |
| 2009/0195435 | A1 | 8/2009 | Kapilevich et al. |
| 2009/0297039 | A1 | 12/2009 | Reinpoldt, III et al. |
| 2011/0205367 | A1 | 8/2011 | Brown et al. |
| 2018/0260688 | A1* | 9/2018 | Kaufhold .................. G01S 13/90 |
| 2019/0333233 | A1* | 10/2019 | Hu ..................... G06K 9/00771 |
| 2020/0218276 | A1* | 7/2020 | Lee ........................ G05D 1/024 |
| 2020/0293064 | A1* | 9/2020 | Wu ...................... G05D 1/0246 |
| 2021/0026355 | A1* | 1/2021 | Chen .................. G06K 9/00791 |

OTHER PUBLICATIONS

PatriotOne Technologies web page, product PATSCAN™ CMR Cognitive Microwave Radar (500MHz-5GHz, downloaded Mar. 9, 2019 from website https://patriot1tech.com/solutions/patscan-cmr/ 17 Pages.

Flir web page, FLIR thermal imaging for wildlife detection, web page downloaded Mar. 9, 2019 https://www.flir.com/discover/ots/outdoor/a-perfect-tool-for-finding-wildlife/ 10 Pages.

Disclosed Anonymously, 360-Degree Volumetric Ultrasound Imaging Using Back-to-Back Transducer Arrays, IP.com Prior Art Database Technical Disclosure, IP.com No. IPCOM000214483D, Jan. 31, 2012, 8 pages.

Disclosed Anonymously, Simplified Calibration for Phased Array Inspection, IP.com Prior Art Database Technical Disclosure, IP.com No. IPCOM000248545D, Dec. 15, 2016, 10 pages.

Uchendu, et al, Survey of Beam Steering Techniques Available for Millimeter Wave Applications, Progress In Electromagnetics Research B, vol. 68, Mar. 2016, p. 35-54.

Demi, L., Practical Guide to Ultrasound Beam Forming Beam Pattern and Image Reconstruction Analysis, Appl. Sci. 2018, 8, 1544; doi:10.3390/app8091544, Apr. 2018, 15 pages.

Benton DM. Multiple beam steering using dynamic zone plates on a micromirror array. Optical Engineering. Jul. 2018;57(7) p. 073109. (12 Pages Total).

Zhou, A. et al., Following the Shadow: Agile 3-D Beam-Steering for 60 GHz Wireless Networks, IEEE Infocom 2018—IEEE Conference on Computer Communications. IEEE, 2018, (pp. 2375-2383).

\* cited by examiner

RADAR-BASED DETECTION OF OBJECTS WHILE IN MOTION

BACKGROUND

The present invention relates to the electrical, electronic, and computer arts, and, more particularly, to security screening systems based on radar.

The detection of undesired concealed objects remains a critical capability in protecting society from inappropriate and unlawful conduct. Passenger screening technologies are, for example, widely deployed at airports. Some of these systems utilize x-ray or millimeter-wavelength detection technologies to image passengers. In order to be imaged, the passenger is required to enter a portal or confined space and to remain still for several seconds while the imaging is accomplished. These screening systems, in turn, generate television-like digital images that can be evaluated by human operators trained to identify objects of interest, sometimes with the assistance of image enhancing software. Metallic and plastic undesired concealed objects, which emit or reflect radiation differently from the human body, are distinguishable from the background image of the body.

Nevertheless, these solutions have raised concerns about privacy, they are difficult to deploy due to their large size, and they introduce delays in getting through security. Privacy is of concern because anatomic details of an individual are provided by these imaging technologies. X-rays pose health risks and are used for luggage screening but not for people. Finally, the need to have a passenger remain still for several seconds to allow the image to be captured slows the screening process and may create unacceptably long waits at security checkpoints. Accordingly, effective screening at high-traffic facilities such as schools, shopping malls, and train stations becomes impractical.

There is, as a result, a need for alternative security screening technologies that address the above-identified shortcomings.

SUMMARY

Embodiments in accordance with aspects of the invention provide security screening systems based on radar for detecting objects while in motion.

Aspects of the invention are directed to a method for detecting and classifying an object. A radar beam is steered across a screening volume. A return signal from the object is received over time as the object moves in the screening volume to create a three-dimensional temporal signature for the object. The three-dimensional temporal signature is classified utilizing a classification process based at least in part on a deep neural network model. An alert is provided when the object is classified as an object of interest.

Additional aspects of the invention are directed to a screening system comprising a radar transmitter, a radar receiver, and a processing unit. The radar transmitter is operative to steer a radar beam across a screening volume. The radar receiver is operative to receive a return signal from an object over time as the object moves in the screening volume to create a three-dimensional temporal signature for the object. Finally, the processing unit is operative to classify the three-dimensional temporal signature utilizing a classification process based at least in part on a deep neural network model, and to provide an alert when the object is classified as an object of interest.

Even additional aspects of the invention are directed to a screening system comprising a radar transmitter, a first radar receiver, a second radar receiver, and a processing unit. The radar transmitter is operative to steer a radar beam across a screening volume. The first radar receiver is operative to receive a first return signal from an object over time as the object moves in the screening volume to create a first three-dimensional temporal signature for the object. The second radar receiver is in spaced relation to the first radar receiver and is operative to receive a second return signal from the object over time as the object moves in the screening volume to create a second three-dimensional temporal signature for the object. The processing unit is operative to classify the first and second three-dimensional temporal signatures utilizing a classification process based at least in part on a deep neural network model, and to provide an alert when the object is classified as an object of interest.

BRIEF DESCRIPTION OF THE DRAWINGS

These and other features, aspects, and advantages of the present invention will become better understood with regard to the following description, appended claims, and accompanying drawings where:

DETAILED DESCRIPTION

The present invention will be described with reference to illustrative embodiments. For this reason, numerous modifications can be made to these embodiments and the results will still come within the scope of the invention. No limitations with respect to the specific embodiments described herein are intended or should be inferred.

As used herein and in the appended claims, an "object of interest" is defined to include any object prohibited from carry into a given facility such as a school, factory or stadium, or onto a vehicle of mass transit such as a bus, aircraft, or train. The word "about" means within plus or minus ten percent. A "processing unit" encompasses a single processing element, or a cooperation between multiple processing elements, whether local or remote to each other.

Figure 1:
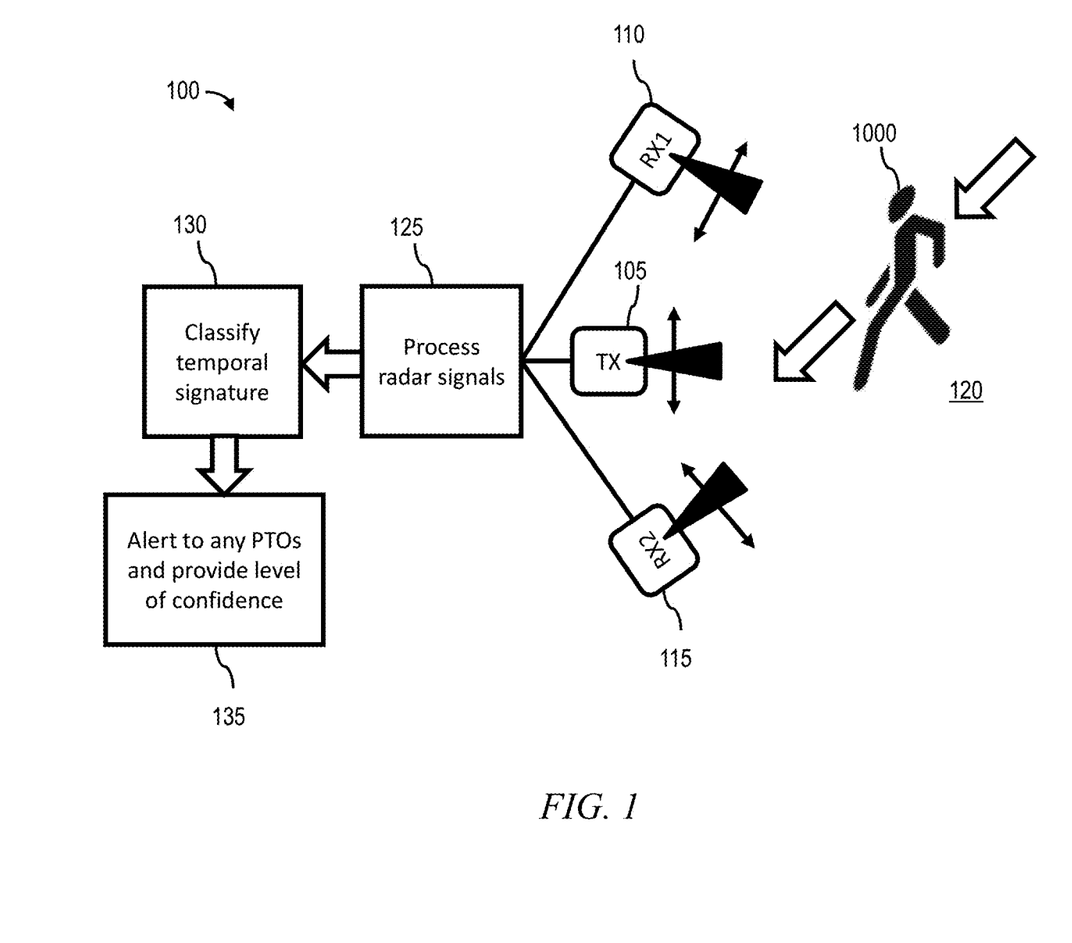
FIG. 1 shows a diagrammatic representation of a screening system in accordance with an illustrative embodiment of the invention for detecting objects of interest.

FIG. 1 shows a diagrammatic representation of a screening system 100 in accordance with an illustrative embodiment of the invention for detecting objects of interest. The screening system 100 includes a radar transmitter (TX) 105 as well as two radar receivers (RX1 and RX2) 110, 115, which are positioned in spaced relation to one another. The radar transmitter 105 steers a radiofrequency beam (i.e., radar beam) both vertically and horizontally across a screening volume 120. A person 1000 moving within the screening volume 120 is thereby illuminated by this radar beam, and the person and any objects carried by the person 1000, whether concealed or not, reflect or scatter (i.e., return) some portion of the radar beam back to the two radar receivers 110, 115. With the radar transmitter 105 rapidly steering a beam in this manner, each radar receiver 110, 115, in turn, produces a three-dimensional (3D) return radar signal for a given object that changes with time as the person 1000 and the object move within the screening volume 120. The resultant 3D temporal signatures are processed in block 125 and then classified in block 130. The classification process used in block 130 is based at least in part on a deep neural network (DNN) model. If an object is classified as an object of interest, the screening system 100 provides an alert in block 135 along with a classification of the detected object and a level of confidence in the classification.

In one or more embodiments, the radar transmitter 105 may produce short-wavelength electromagnetic waves with wavelengths between about one and about ten millimeters (mm), corresponding to frequencies between about 30 to about 300 gigahertz (GHz). Beam scanning may be accomplished using a phased-array antenna configuration. Radar output may be based on any one of several well-known radar transmission techniques, such as, but not limited to, frequency modulated continuous wave (FMCW) or code-modulated using a pseudo-random binary sequence (PRBS). The two radar receivers 110, 115 may utilize electronic beam steering to detect the returned radiofrequency radiation across the screening volume 120. The two radar receivers 110, 115 may scan their sense angles in coordination with the scanning of the transmit angle, or may instead scan their sense angles at a rate higher than the scanning of the transmit angle so that the radar receivers 110, 115 make a complete sweep for each transmit angle. Multiple radar receivers tend to provide extra accuracy in detecting certain objects. For example, metal objects, especially flat ones, may create a shining effect in specific directions that is best detected by two or more spaced-apart radar receivers. Instead of or in addition to beamforming, the radar receivers 110, 115 may employ multiple-input-and-multiple-output (MIMO) techniques to resolve the angle of arrival of incoming reflections.

Radar transmitters and receivers will generally be familiar to one having skill in the relevant arts. Additional information is also available in many readily available publications including, for example, G. L. Charvat, *Small and Short-range Radar Systems*, CRC Press, 2015, which is hereby incorporated by reference herein.

Figure 2:
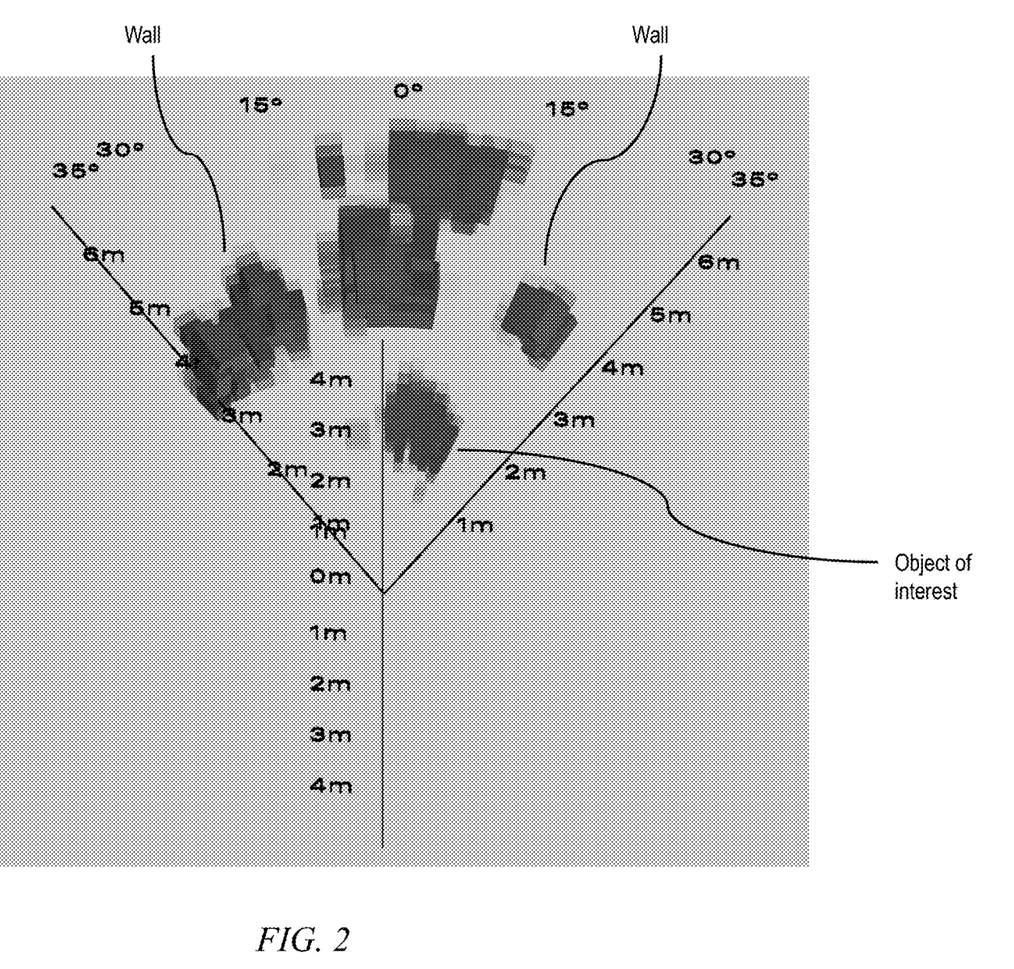
FIG. 2 shows an exemplary set of voxels that may be produced by the FIG. 1 screening system.

The output data for a given time period from each of the radar receivers 110, 115 can be represented volumetrically as a 3D grid of voxels showing returned radar energy across the screening volume 120. FIG. 2 shows an exemplary set of voxels in accordance with aspects of the invention. Each voxel describes a returned signal from a particular horizontal direction, vertical direction, and depth in the screening volume 120. The volumetric data aggregates to create a 3D temporal signature (i.e., a four-dimensional tensor) as an object moves in the screening volume 120 and radar returns are received from multiple beam directions. The two radar receivers 110, 115 provide two channels of such 3D temporal data, creating what is hereinafter referred to as a dual-channel 3D temporal signature. Even with limited range or angular resolution the two radar receivers 110, 115 create a rich set of data that can compensate for potential bandwidth and beamwidth limitations of low-cost phased arrays.

Figure 3:
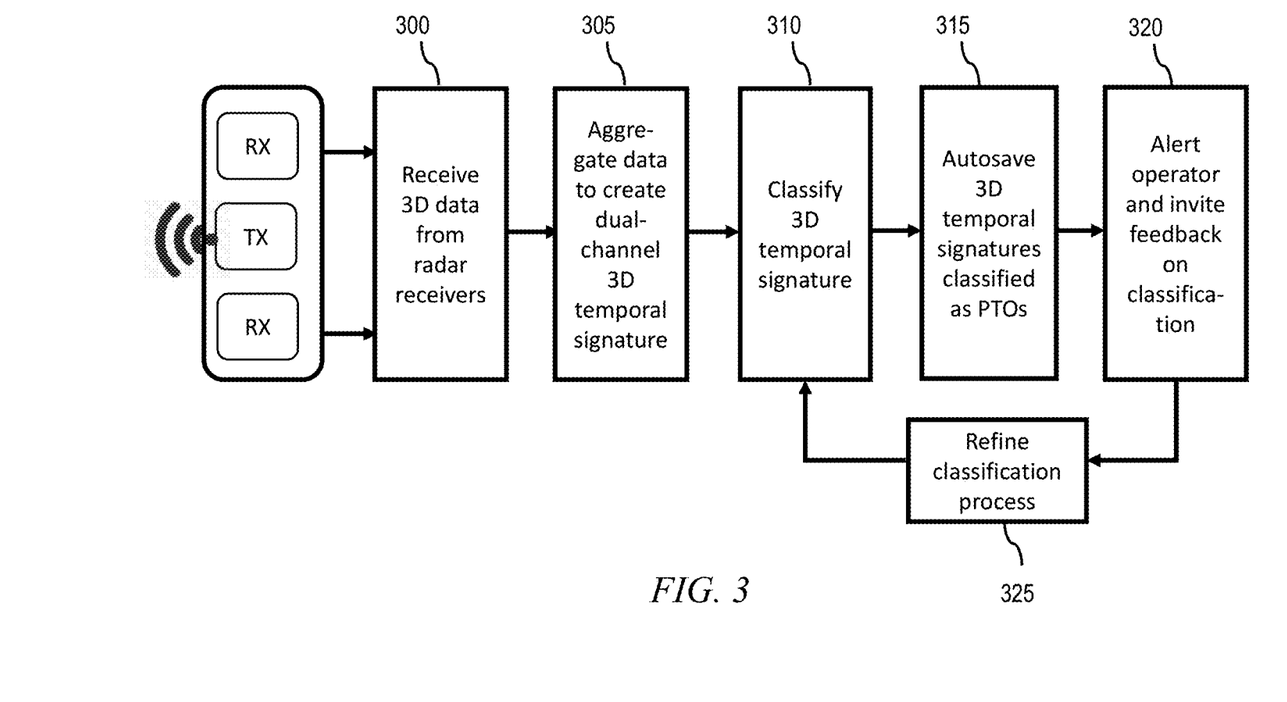
FIG. 3 shows a block diagram providing additional details of the processes utilized in the FIG. 1 screening system.

FIG. 3 shows a block diagram providing additional details of the processes utilized in the exemplary screening system 100, more particularly, how an initial system can be improved with subsequent training. In block 300, the screening system 100 receives the 3D data from the two radar receivers 110, 115. Next, in block 305, this data is aggregated over time to create the dual-channel 3D signature. In block 310, the dual-channel 3D temporal signature is processed to detect and classify any objects of interest. Dual-channel 3D temporal signatures classified as objects of interest are then autosaved into a memory in block 315, and, in block 320, an operator is alerted that the screening system 100 has classified an object of interest and provided with an associated level of confidence in the classification. The operator is also invited to provide feedback on the classification. The operator may, for example, manually or by some other means, inspect the suspicious object and then input whether the classification is in fact correct or incorrect in detecting and classifying an object of interest. Additionally, the operator may associate a class of object with the suspicious object (e.g., tablet, phone, laptop) to reduce future false-positives.

The feedback provided in block 320 provides further training to the classification process in block 310, allowing the classification process to be refined. If, for example, the dual-channel 3D temporal signature is classified as an object of interest in block 320, but turns out to be something innocuous upon further investigation, then the classification process is further refined in block 325 to distinguish the innocuous object from objects of interest in the future. Conversely, if the object is confirmed to be an object of interest in block 320, then the classification process is refined in block 325 to have a higher a level of confidence in that classification when used in the future.

As indicated earlier, the classification process utilized in block 310 (and refined in block 325) is based at least in part on the application of a trained DNN model to the dual-channel 3D temporal signature. A DNN is a form of deep learning (DL) architecture utilizing an artificial neural network with multiple layers between the input and output layers. The DNN finds the correct mathematical manipulation to turn the input into the output, whether it be a linear relationship or a non-linear relationship. The network moves through the layers calculating the probability of each output. DL architectures and their implementation will already be familiar to one having ordinary skill in the relevant arts. Moreover, such machine learning architectures are described in many readily available publications including, as just one example, I. Goodfellow et al., *Deep Learning*, MIT Press, 2016, which is hereby incorporated by reference herein.

Figure 4:
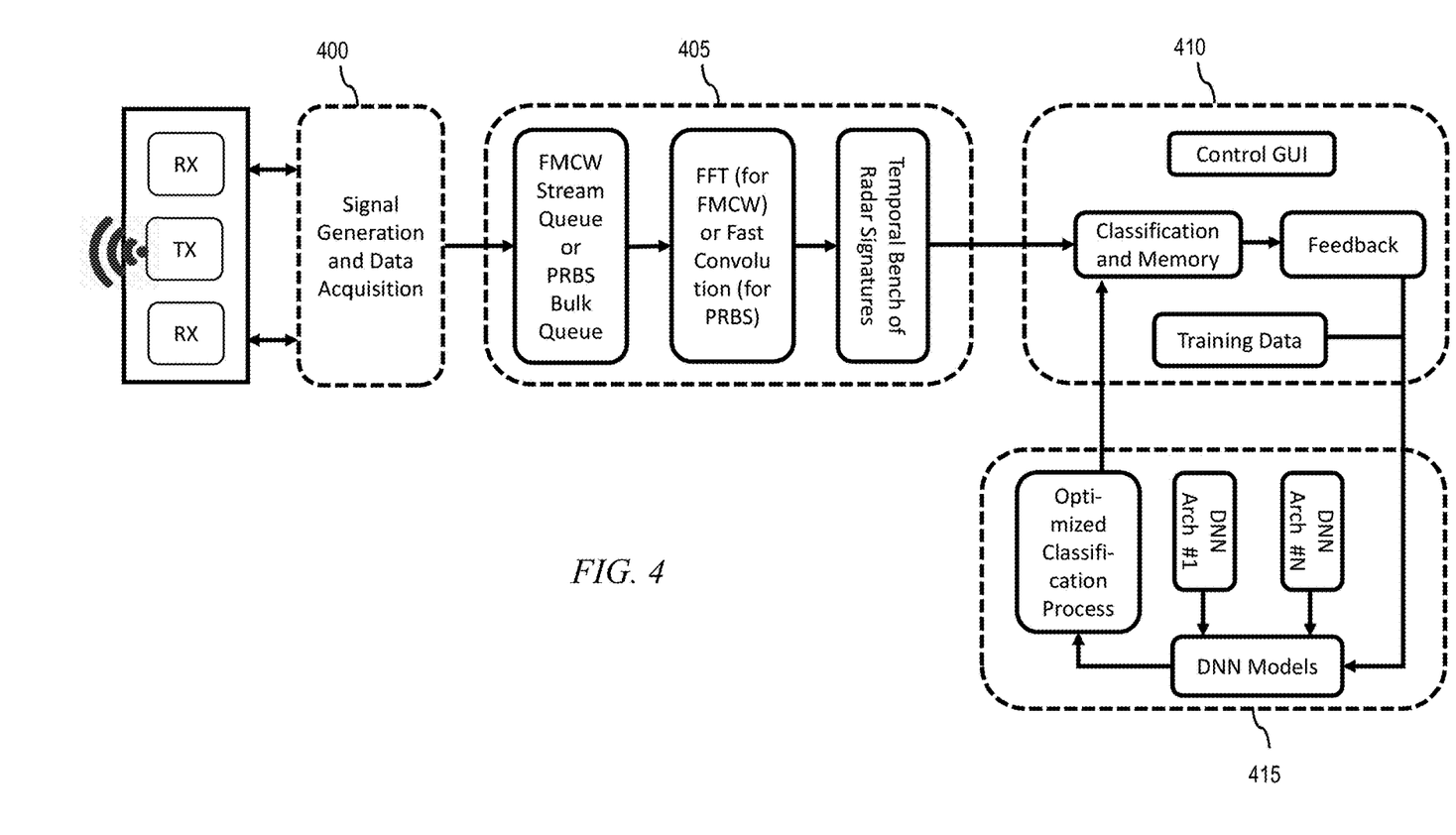
FIG. 4 shows a diagrammatic representation of an illustrative system architecture for use in the FIG. 1 screening system.

FIG. 4 shows a diagrammatic representation of an illustrative system architecture for use in the screening system 100. The architecture includes several modules that act to fulfill the above-described functionality. Several of the modules, in turn, comprise a respective set of sub-elements that perform more specific functions. The modules may variously be implemented in hardware, in software, or in a combination of hardware and software.

Still referring to FIG. 4, a radar operations module 400 is operative to cause the radar transmitter 105 to transmit radar signals and to acquire data from the radar receivers 110, 115. As indicated earlier, signal generation may be by common radar protocols such as FMCW or PRBS. Data from the radar operations module 400 is then sent to a signal processing module 405, which accepts the received data as a FMCW stream queue or PRBS bulk queue, as the case may be. Fast Fourier transform (FFT) is performed on the FMCW stream queue while fast convolution is performed on the PRBS bulk queue. In both cases, a temporal bench of radar signatures is achieved, forming the dual-channel 3D temporal signature for a given object.

The dual-channel 3D temporal signature is then sent to a classification module 410, where the classification process is applied to the dual-channel 3D temporal signature to achieve a classification and level of confidence. Data is also saved to memory in this module, and results may be provided to an operator via a control graphical user interface (GUI). Moreover, as described above, the classification module 410 also invites the operator to provide feedback on the classification. Classifications may thereby be labeled as true or false based on the feedback. More varied feedback labels may also be made available to reflect how close or far a classification is from reality. That is, the labels need not be binary.

A machine learning module 415 receives the dual-channel 3D temporal signature and the labeled classification from the classification module 410, and refines (i.e., trains) the classification process that is ultimately utilized by the classification module 410 to make classifications of objects of interest. Several DNN architectures (i.e., DNN architectures (Arch) 1 through N) are utilized in DNN models to formulate an optimized classification process, which is returned to the classification module 410 for use in further classifications. In addition, the classification module 410 may also submit training data to the machine learning module 415 to further help in formulating the optimized classification process.

When an object of interest is detected, the classification module 410 may provide an alert in a timely manner by, for example, activating any number of alarm mechanisms, including those that depend on sound and/or light to get the attention of the authorities. Authorities may also be alerted by text message or automated phone call. The screening system 100 may also cause other actions to occur such as the raising, lowering, closing, locking, or other manipulation of an object such as a gate, door, or window. If desired, a threshold level of confidence may be programmed into the screening system 100 so that alarms are not activated if the threshold level of confidence is not achieved for a given classification.

As indicated above, the illustrative screening system 100 identifies and detects on-body objects based on millimeter-wave radar information in combination with machine learning (i.e., artificial intelligence) rather than relying on a technology that requires highly-resolved, television-like images for object identification. In so doing the screening system 100 provides several advantages over conventional screening technologies. The screening system 100 does not provide any anatomic details of the screened subject, avoiding issues with privacy. Moreover, a person being screened may move during the screening process and is not required to remain still in a confined volume, avoiding bottlenecks. More than one person moving within the screening volume may be screened simultaneously, also aiding throughput. The screening system 100 is also portable and thereby easy to install at multiple locations in comparison to conventional imaging portal scanners, which are large, heavy, and not portable. Finally, although an operator may help to provide feedback to the screening system 100, the screening system 100 may function autonomously without an operator, providing alerts/alarms as needed when objects of interest are classified.

It should again be emphasized that the above-described embodiments of the invention are intended to be illustrative only. Other embodiments can use different types and arrangements of elements for implementing the described functionality. These numerous alternative embodiments within the scope of the appended claims will be apparent to one skilled in the art. The spirit and scope of the appended claims should not be limited solely to the description of the preferred embodiments contained herein.

Figure 5:
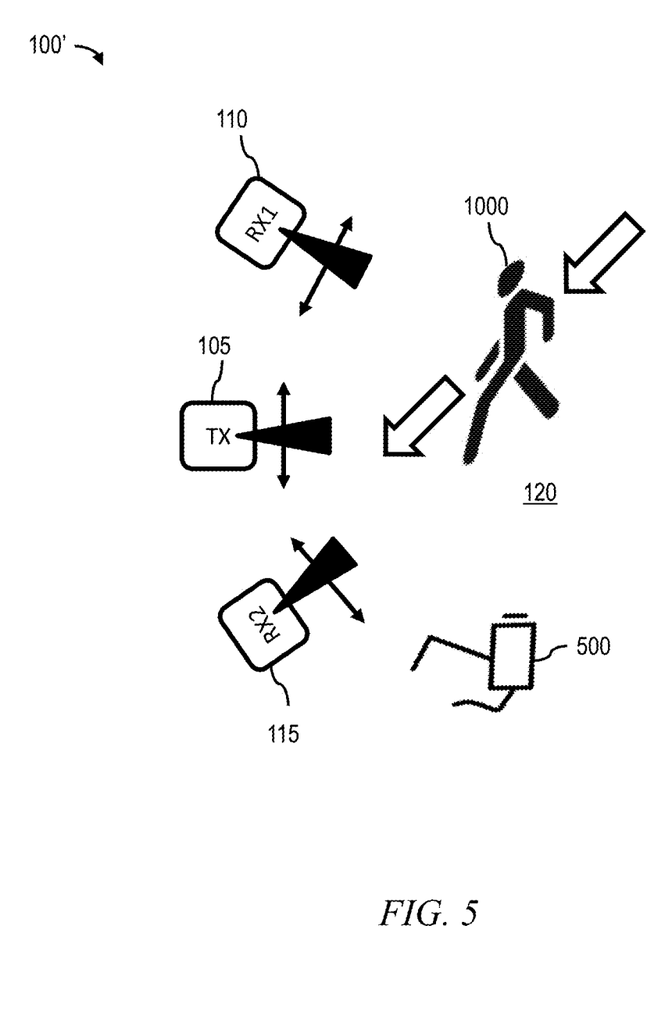
FIG. 5 shows a diagrammatic representation of an alternative screening system in accordance with an additional illustrative embodiment of the invention.

For example, in one or more alternative embodiments, a camera may be added to the screening system 100 to provide additional information useful in screening for objects of interest. FIG. 5 shows an alternative screening system 100' in accordance with an additional embodiment of the invention, where elements identical to those in FIG. 1 are labeled with like reference numerals. The alternative screening system 100' includes a video camera 500 in addition to the radar equipment. The video camera 500 is operative to observe the screened person 1000 moving within the screening volume 120, allowing the screening system 100' to observe the articulated posture of the screened person 1000 as well as other actions by the screened person 1000 that may suggest that the screened person is trying to deceive the screening system 100'. The information about the motion of the subject from the video camera can also be employed to guide or optimize the area being scanned by the radar transmitter 105 and radar receivers 110, 115. Video data from the video camera 500 may be combined with the dual-channel 3D temporal signature created by the radar elements to add an additional layer of data. The data may be processed by DNN models in a manner similar to the radar data.

Figure 6:
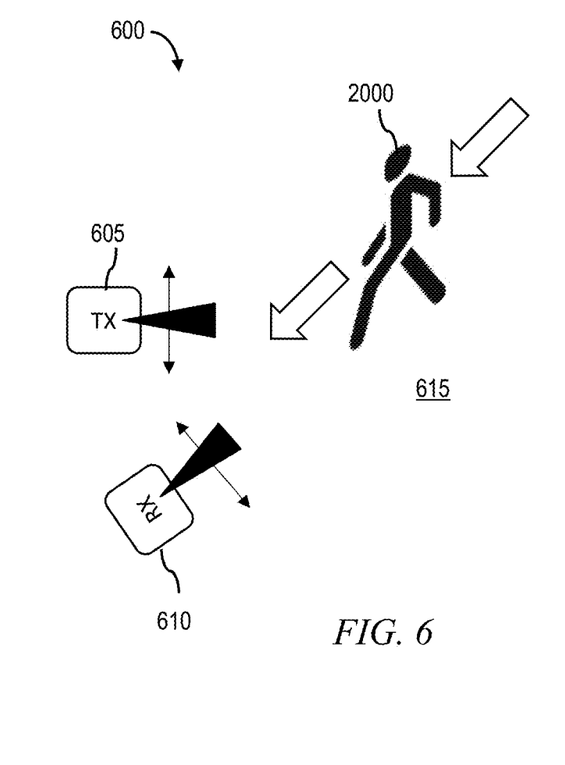
FIG. 6 shows a diagrammatic representation of an alternative screening system in accordance with even another illustrative embodiment of the invention.

Alternative embodiments of the invention may also use more or less than two radar receivers (i.e., one radar receiver; three or more radar receivers), and more than one radar transmitter. FIG. 6, for example, shows a diagrammatic representation of an alternative screening system 600 in accordance with another alternative embodiment of the invention. The alternative screening system 600 utilizes a single radar transmitter 605 and only a single radar receiver 610 to observe a screened person 2000 moving within a screened volume 615.

Figure 7:
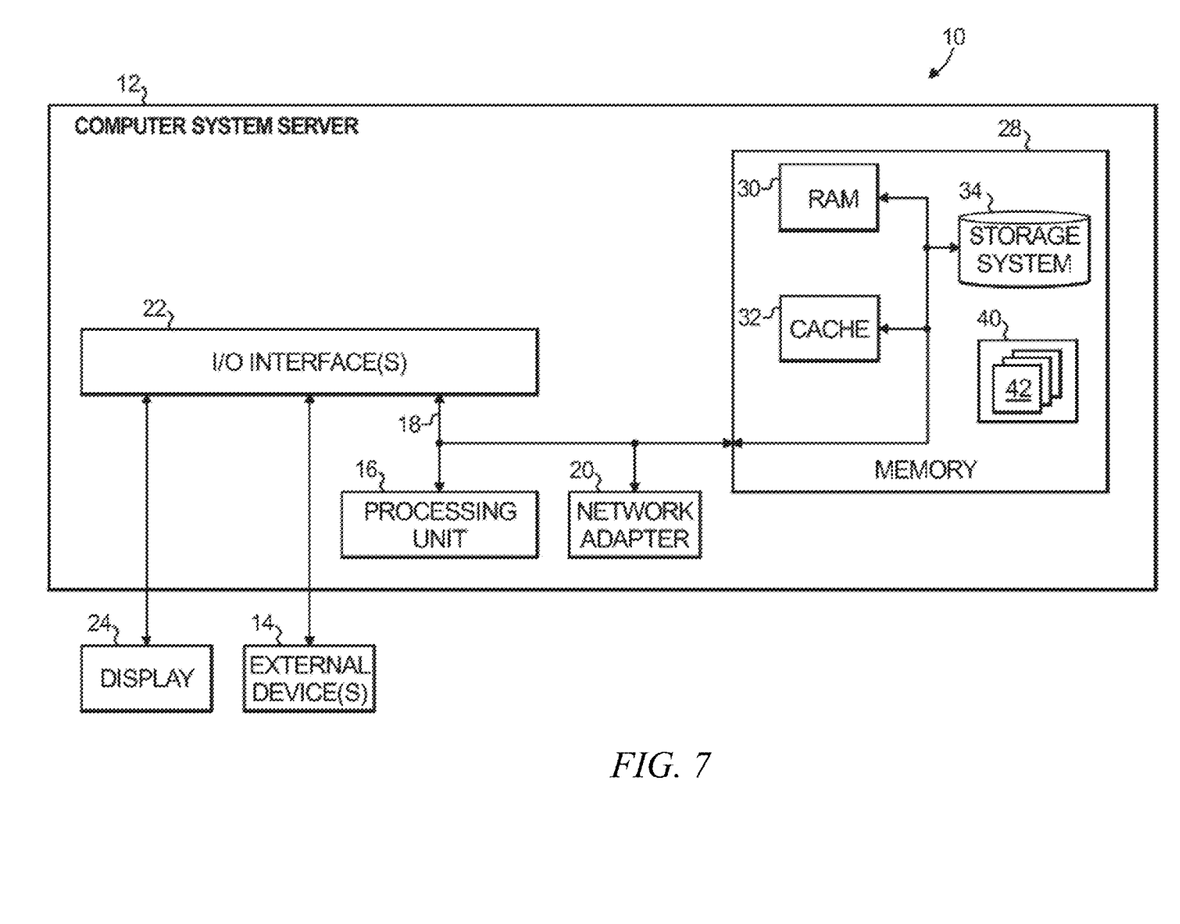
FIG. 7 shows a block diagram of a computer system that may be useful in implementing one or more aspects and/or elements of the invention.

One or more embodiments of the invention, or elements thereof, can be implemented in the form of an apparatus including a memory and at least one data processor (i.e., a form of logic circuitry) that is coupled to the memory and operative to perform exemplary method steps. FIG. 7 depicts a computer system that may be useful in implementing one or more aspects and/or elements of the invention (e.g. steps 300-325 in FIG. 3). Referring now to FIG. 7, system 10 is only one example and is not intended to suggest any limitation as to the scope of use or functionality of embodiments of the invention described herein. Regardless, system 10 is capable of being implemented and/or performing any pertinent aspects of the functionality set forth hereinabove.

In system 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. A field programmable gate array (FPGA) is also a viable option.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, as well as removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Even more, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 7, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of logic circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 7) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

All the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

Any element in a claim that does not explicitly state "means for" performing a specified function or "step for" performing a specified function is not to be interpreted as a "means for" or "step for" clause as specified in AIA 35 U.S.C. § 112(f). In particular, the use of "steps of" in the claims herein is not intended to invoke the provisions of AIA 35 U.S.C. § 112(f).

What is claimed is:

1. A method for detecting and classifying an object, the method comprising the steps of:
    steering a radar beam across a screening volume;
    receiving a return signal from the object over time as the object moves in the screening volume to create a three-dimensional temporal signature for the object;
    classifying the three-dimensional temporal signature utilizing a classification process based at a deep neural network model, the deep neural network model trained to process two four-dimensional tensors, each four-dimensional tensor based on a three-dimensional grid of voxels, each voxel describing the returned signal from a particular horizontal direction, a particular vertical direction and a particular depth in the screening volume; and
    providing an alert when the object is classified as an object of interest.

2. The method of claim 1, wherein the method further comprises the step of providing a level of confidence when an object is classified as an object of interest.

3. The method of claim 1, wherein the received return signal is stored in a memory device as a data structure represented by the four-dimensional tensor.

4. The method of claim 1, further comprising the step of inviting feedback on the classification process.

5. The method of claim 4, further comprising the step of refining the classification process based at least in part on the feedback.

6. The method of claim 1, wherein classifying the three-dimensional temporal signature utilizes video data from a video camera.

7. The method of claim 1, wherein the step of providing an alert comprises raising, lowering, closing, or locking an object.

8. The method of claim 1, wherein the radar beam has a wavelength between about one and about ten millimeters.

9. A screening system comprising:
    a radar transmitter operative to steer a radar beam across a screening volume;
    a radar receiver operative to receive a return signal from an object over time as the object moves in the screening volume to create a three-dimensional temporal signature for the object; and
    a processing unit operative to classify the three-dimensional temporal signature utilizing a classification process based at least in part on a deep neural network model, the deep neural network model trained to process two four-dimensional tensors, each four-dimensional tensor based on a three-dimensional grid of voxels, each voxel describing the returned signal from a particular horizontal direction, a particular vertical direction and a particular depth in the screening volume, and to provide an alert when the object is classified as an object of interest.

10. The screening system of claim 9, further comprising a memory storing computer readable program code executable by the logic circuitry.

11. The screening system of claim 9, wherein the radar transmitter comprises a phased-array antenna.

12. The screening system of claim 9, wherein the processing unit is further operative to provide a level of confidence when an object is classified as an object of interest.

13. The screening system of claim 9, wherein the processing unit is further operative to invite feedback on the classification process.

14. The screening system of claim 13, wherein the processing unit is further operative to refine the classification process based at least in part on the feedback.

15. The screening system of claim 9, further comprising an alarm that may be activated by the processing unit upon classifying an object of interest.

16. The screening system of claim 9, wherein the radar receiver is operative to resolve one or more angles of arrival of the return signal.

17. The screening system of claim 9, further comprising a video camera providing video data, wherein the processing unit is further operative to utilize the video data in the classification process.

18. The screening system of claim 9, wherein the radar beam has a wavelength between about one and about ten millimeters.

* * * * *